Sept. 6, 1955            R. FERBER          2,717,134
STAND WITH DAMPING DEVICE FOR PHOTOGRAPHIC
OR TELEVISION CAMERAS
Filed Jan. 6, 1951                            2 Sheets-Sheet 1
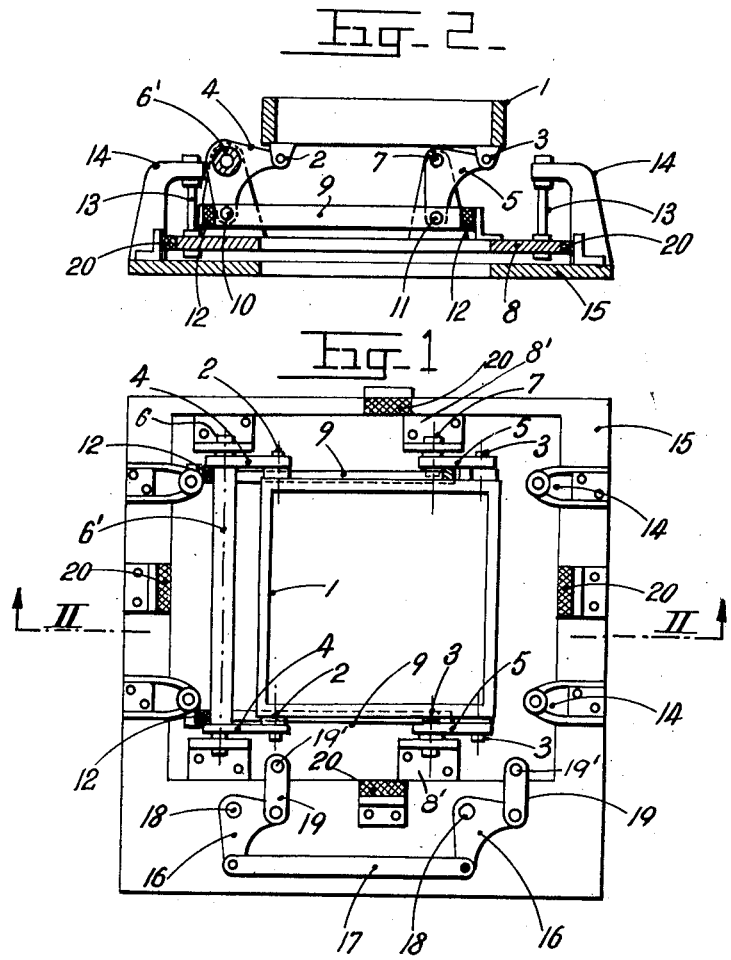
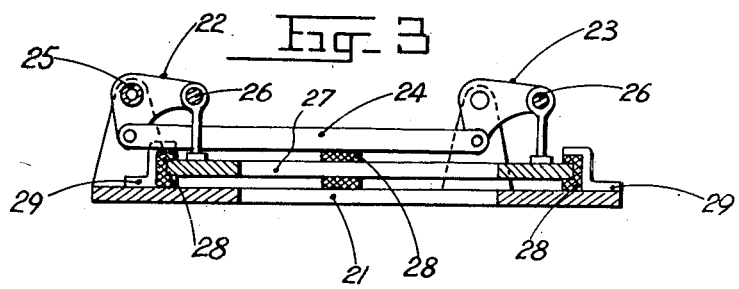
Inventor
Robert Ferber
By Robert E. Burns
Attorney Sept. 6, 1955 R. FERBER 2,717,134
STAND WITH DAMPING DEVICE FOR PHOTOGRAPHIC
OR TELEVISION CAMERAS
Filed Jan. 6, 1951 2 Sheets-Sheet 2
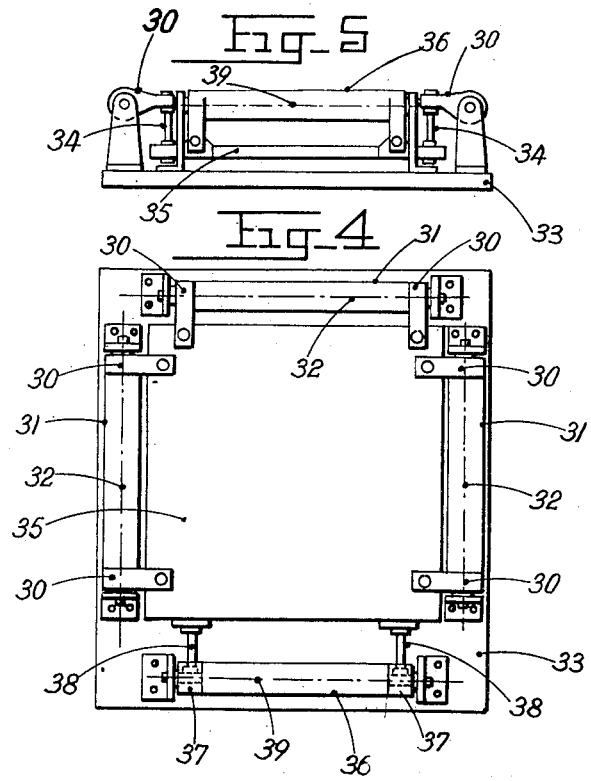
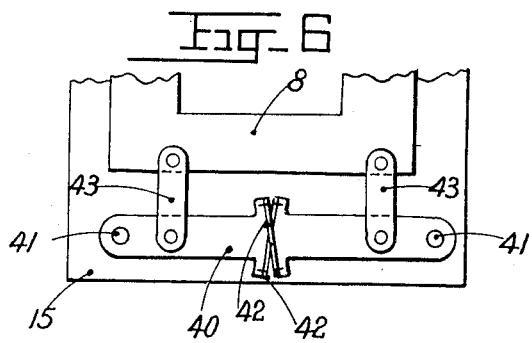
Inventor
Robert Ferber
By Robert E. Burns
Attorney

United States Patent Office 2,717,134
Patented Sept. 6, 1955

2,717,134

STAND WITH DAMPING DEVICE FOR PHOTO-GRAPHIC OR TELEVISION CAMERAS

Robert Ferber, Courbevoie, France, assignor to Usines Gallus Societe Anonyme, Courbevoie, France, a corporation of France Application January 6, 1951, Serial No. 204,782

Claims priority, application France March 21, 1950

10 Claims. (Cl. 248—11)

The movements to which a photographic or television camera may be subjected when a picture is being taken may be regarded as movements of translation and rotation. The translations are not serious if they are slight. They have the same effect as would be had by movements of translation, that are exactly the same but of opposite direction, of the actual photographed object, with the camera assumed to be stationary.

The damped movements of translation of photographic or television cameras as a result of vibrations have a small amplitude and do not affect the sharpness of the image if the object is not very close.

It is not the same for rotations that may be broken up into rotations around three axes at right angles, one of them being the optical axis of the lens. A rotation of an angle $a$ around an axis at right angles to the optical axis is equivalent to a maximum image movement equal to the product of $a$ and the focal distance divided by the square of the cosine of the half angle of view. The same is true of the rotations around the axis of the lens resulting in a maximum movement corresponding to $a$ multiplied by $d$, $a$ being the angle of rotation and $d$ the half diagonal of the image. These two movements are independent, therefore, of the distance of the object.

While the translations, therefore, are unimportant, the rotations of the apparatus mentioned, which for the sake of simplicity in the following description will be referred to generally as "cameras," may have a disturbing effect on the sharpness of the images. These rotations are caused primarily by couples arising from the effect of impulses received by the camera and from its own inertia. As a result of resonance, when the camera is flexibly hung, troublesome swinging movements may be set up, even if the damping devices are all exactly the same and arranged symmetrically in relation to the center of gravity of the entire moving portion.

The aim of my invention lies in a camera stand that enables the camera, when it is subjected to vibrations, as happens for instance on board aircraft, to move around in any direction through motions of translation, that are damped, while this stand makes it impossible for the camera to undergo any rotary motion in relation to the flooring or to the parts on which the stand is fastened.

The stands that will now be described, together with modified forms given as non-restrictive examples, will make it clear how the invention may be embodied, while the special features referred to in the description and shown in the drawings are included within the scope of the invention.

Figure 1 shows a plan of a stand frame corresponding to the invention.

Figure 2 is a sectional view, partly in elevation, of the stand of Figure 1 taken along the line II—II.

Figure 3 shows a modified form of the stand of Figures 1 and 2 in a sectional view, partly in elevation, taken along a section approximately through its center.

Figure 4 is a plan view of another modified form of stand.

Figure 5 shows the stand of Figure 4 in end elevation.

Figure 6 shows a device for causing the equal and parallel movements of two pivot points.

In Figure 1 and Figure 2, a frame 1 carries the camera, not shown, of which the optical axis may be given any direction. The camera is connected rigidly to the frame 1. This frame is connected by four pivot pins 2 and 3 to four bell cranks 4 and 5, that may swing around pivot pins 6 and 7 carried by four brackets 8' that are rigidly secured to an intermediate frame 8. Both bell cranks 4 and both bell cranks 5 are exactly the same. Both bell cranks 4 are connected rigidly together, for instance by a tube 6', and each bell crank 4 is connected to the corresponding bell crank 5 by a rod 9 the ends of which are connected by pivot pins 10 and 11 to the vertical arm of said bell cranks 4, 5. The distance between the axes of the pivot pins 2 and 3 of the frame 1, the distance between the axes of the pivot pins 8 and 7, and the distance between the axes of the pivot pins 10 and 11 are equal. The result of this is that the rotation of any one of the bell cranks 4 or 5 causes an exactly similar rotation of the three other parts 4 and 5.

It follows that the frame 1 will move in relation to the frame 8 but will always be parallel to it. It will be possible to restrict this movement by damping devices located for instance at the end of the rods 9 and resting on elbow pieces connected to the frame 8. These dampers may be seen at 12 in Figure 2.

The intermediate frame 8, which is horizontal, is carried by four parallel columns 13 of the same length, fastened to brackets 14 carried by a frame 15. These columns 13 are sufficiently flexible to allow the frame 8 to move slightly in its own plane. They obviously may be replaced by links of equal length hinged on the brackets 14 and the frame 8 by ball and socket joints. In order that the frame 8 may not swivel in its plane it must be held parallel to it. For this purpose, there are hinged to the frame 8 two links 19 which are hinged on bell cranks 16. These bell cranks 16 swivel round pivot pins 18 connected rigidly to the frame 15 and are joined together by a rod 17. It will be seen that as the length of the rod 17 is equal to the distance between the two points 19' of the frame 8 to which are hinged the links 19, and is equal also to the distance between the pivot pins 18 (Fig. 1), the frame 8 and the frame 1 and, consequently, the camera itself always remain parallel to each other.

In order to take into consideration the vertical movements of the frame 8, the links 19 must be slightly flexible or hinged on ball and socket joints or they may be replaced by small flexible columns such as those carrying the frame 8.

The movements of the frame 8 will be restricted in its plane, for instance by means of four dampers 20 fastened to the frame 15.

It will thus be noted that by rigidly fastening the frame 15 to a piece subjected to vibrations, it will be possible for the camera, which is fastened rigidly to the frame 1, to undergo translatory movements in any direction, but not any movements of rotation in relation to this unit.

One of the bell cranks 5, might be eliminated and the desired result would be accomplished since three points of the frame 1 would have exactly the same movements. This result would be accomplished by the invention but the solution given in Figure 1 would be more applicable when dealing with a heavy camera. It would be possible for the two parts 4 to be left unconnected, and to arrange a third hinged system similar to that formed by the bell cranks 4, 5 and rod 9, perpendicularly to the two first ones in the plan view of Figure 1. The frame 1 thus would be carried by six pivot pins located two by two on the three sides of a rectangle, which sides would always remain parallel to a fixed plane. It would be even possible, after bringing in this third parallel motion system, to eliminate one of the first two. The frame 1 would be carried by four pivot pins located on two straight lines at right angles to each other.

Figure 3 shows a modification of the previous arrangement. A frame 21 carries by means of four exactly similar bearers, four bell cranks 22 and 23 connected two by two by rods 24. The bell cranks 22 are connected, e. g. by a rigid tube 25. Two other tubes or rods 26 connect the cranks 22 on the one hand and the cranks 23 on the other. The arrangement employed therefore compels the axes of the rods 26 to remain in the same plane and always parallel to a fixed plane. A frame 27 is connected by four small flexible columns or by four ball and socket links of equal length to the rods 26. It will be noted that in this arrangement the frame 27, on which the camera is fixed rigidly, will always remain parallel to it provided that the rotations around axes perpendicular to its plane are prevented. To do that, all that has to be done is to add to the frame 21 a device, that is not shown, but is identical with that of Figure 1, which prevents the frame 8 from turning in its plane. The damping of the vertical and horizontal swinging movements of the frame 21 may be effected, for instance, by four U-shaped rubber pieces 28 that go around the middle of the sides of the frame 27 and are held against the frame 21 by four double knee joints 29.

Use has been made in the above examples of hinged parallel motion in combination with a torque bar. Figure 4 shows an embodiment of the invention wherein only torsion systems are employed. Six identical levers 30 are connected two by two, for example by rigid tubes 31 that may each swing around an axis 32 parallel to the axis of the tube, these three axes 32 being fixed in relation to a frame 33 by means of rigid bearers. The three axes are arranged along the sides of a parallelogram. The levers 30 each carry a small flexible column 34, all the small columns having the same length and having their axes at the same distance from the axis 32 to which they are connected. These systems may be called "torsion systems" because the rigidity of the assembly of the levers 30 and tubes 31 is ensured by the resistance to torsion of the tubes 31. The other ends of the small columns 34 are housed in a frame 35 on which the camera is fixed rigidly. The frame 35 therefore has six support points which necessarily have the same vertical movements. As for the embodiment of Figure 4, one of the two parallel tubes 31 may be eliminated. But the employment of three tubes 31 would be advisable when handling heavy cameras. If use was made of only two tubes 31, they could form between them an angle varying from a right angle. It will be seen that the rotation of the frame 35 in its plane may still occur. To prevent this, it would be possible to make use of the arrangement of Figure 1 comprising the parts 16, 17 and 19. But as a modification, a torsion system has been shown which accomplishes the same result. As herein shown, it is formed by a tube 36 rigidly connecting two levers 37. The whole may swing around a spindle 39 rigidly secured to the frame 33. Two small columns 38 having axes which are at equal distances from the spindle 39 are fastened to the lever 37 and to the frame 35. The assembly thus set up is identical with the group formed by the parts 30, 31 and 34. But in this case the small columns 38 are at right angles to the small columns 34. It will be noted that it is the resistance to torsion of the tube 36 that hinders the rotation of the frame 35 in its plane.

In this embodiment it will be seen that the camera may be subjected to translatory movements in every direction while any movement of rotation in relation to the bearing gear is prevented.

The small columns 34 and 38 of this embodiment might be replaced by rods with ball and socket joints or universal joints without departing from the invention. The movements of the frame 35 will be restricted by damping devices that are not shown but which may be like those of Figure 3.

Figure 6 shows another embodiment of a mechanism effecting the equal movements of two support points and adapted in Figure 6 to replace the mechanism preventing the movement of rotation in its plane of the frame 8 of Figure 1. Two levers 40 of the same length pivot around two pivot pins 41 at right angles to the frame 15 and fastened to it. These levers 40 are compelled to turn through equal angles by means of intermeshing teeth or by means of cylindrical surfaces over which roll flexible blades 42 which are fastened at one end to one of the levers and at the other end to the second lever. One of the levers may also be provided with a finger which will fit into a hole formed in the other lever. This arrangement would be suitable for small rotary movements.

On each of the levers 40 is hinged, at the same distance from the pivot 41, a flexible link 43 which is also hinged to a pivot point of the frame 8. Both hinge points on the frame 8 are such that both links 43, assumed of equal length, are parallel. It will be seen that movement of one of the hinge points on the frame 8 involves identically the same movement of the other hinge point, the movements being carried out in the plane of the frame 8. The links 43, of course, might be replaced by small flexible columns or they could be provided with ball and socket joints. The radii of the two levers might also differ and have values $r^1$ and $r^2$. In this case, it would be sufficient for the hinge points of the links 43 on the levers to be, respectively, at distances $d^1$ and $d^2$ from the axes of rotation 41 so that we have the relation $$\frac{d^1}{r^1} = \frac{d^2}{r^2}$$

It is to be noted that the pivot pins 41 could be fastened to the frame 8 and the links hinged at two fixed points on the frame 15. The desired effect would also be obtained.

It is thus possible to provide a large number of modified forms of stands corresponding with the invention by combining hinged parallel motion, torsion or levers or lever systems.

As all the rotary motions of the apparatus with which the invention is concerned are of very low amplitude, all the axes of rotation mentioned or shown on the drawings might be replaced by carefully arranged flexible blades. It would be possible, for instance, to fasten both ends of the tubes 31 of Figure 4 to flexible blades located in a vertical plane passing through the axis 32 and to fasten their other ends to parts rigidly secured to the frame 33. It will be seen that the axis 32 would remain horizontal but might be subjected to slight movements in the horizontal plane, which however would be of a minor nature.

The damping devices used in the embodiments described may be rubber bumpers, metallic springs, or formed by pistons compressing fluids, or the like. The character of these damping devices or their location, provided that they are efficient, does not involve any change in the principle of the invention.

I claim:

1. A support for photographic and television apparatus and the like, said support being adapted to rest on a platform subject to vibrations to prevent transmission of the vibrations to the apparatus, said support comprising a frame for receiving the apparatus and adapted to be rigidly secured to the apparatus, a base plate adapted to be rigidly secured to the platform, and means for suspending said frame upon said base plate, said suspending means comprising a plurality of supports secured to said base plate, and connecting means flexibly interconnecting said supports with said frame, said connecting means including horizontally pivoted lever arms and rigid supports carrying said lever arms and flexible jointing means positioned to receive the movements of said lever arms, one of said lever arms and said flexible jointing means being connected to said frame, a mechanical connection between said lever arms to compel simultaneous oscillating movement of said arms, and means for compelling the frame to resist rotational movements upon oscillating movement of said arms, said last-named means being pivotally mounted upon said base plate.

2. A support according to claim 1, in which the means for resisting the rotation of the frame relatively to the base plate comprise a parallelogram, articulated about two pivots having axes perpendicular to and carried by the base plate, a pair of identical levers, parallel and similarly arranged to oscillate about the said axes integrally with the articulated parallelogram, and in which said flexible jointing means comprises a pair of identical attaching means joining together the frame and the free end of each of the levers.

3. A support according to claim 1, in which the means for the suspension of the frame on the base plate comprise three pairs of levers joined together two by two by a rigid tube, an articulated pivot for each of said tubes, each of the pivots being supported rigidly and at the same height on and parallel to the base plate according to intersecting directions, pairs of identical attaching means comprising flexible jointing members for joining together the frame and the free ends of each of the said pairs of levers.

4. A support according to claim 1, in which the means for preventing the rotation of the frame relatively to the base plate comprise a pair of levers joined together by a rigid tube, an articulated pivot for said tube supported rigidly on and parallel to the base plate, a pair of identical attaching means comprising flexible jointing members for joining together the frame and the free ends of the two levers.

5. A support according to claim 1, in which the means for preventing the rotation of the frame relatively to the base plate comprise two levers engaged one with the other and each articulated at its opposite end about an axis perpendicular to and carried by the base plate, two identical parallel attaching means each one comprising a flexible jointing member joining respectively an intermediate point of each lever to the edge of the frame.

6. A support as defined in claim 1 further comprising elastic shock absorbing means interposed between said frame and said base plate.

7. A support as defined in claim 1, wherein there is provided an intermediate base, said flexible jointing means connecting said supports to said intermediate base, and said pivoted lever arms being secured to said intermediate base and to said frame.

8. A support as defined in claim 1, wherein said flexible jointing means connect said frame to said lever arms, said lever arms being pivoted to said supports.

9. A support as defined in claim 1, wherein said lever arms are pivotally mounted on said supports and said flexible jointing means interconnect said lever arms with said frame.

10. A support as defined in claim 1, wherein there is provided an intermediate base, said flexible jointing means interconnecting said supports to said intermediate base, and said articulated lever arms being secured to said intermediate base and to said frame, and wherein said means for resisting rotational movement comprise two arms pivotally mounted on said base plate, said arms being arranged for pivotal movement in a plane parallel to the plane of the base plate, and two links articulated to said arms and to said intermediate base for movement in a horizontal plane.

References Cited in the file of this patent

UNITED STATES PATENTS

| | | |
|---|---|---|
| 1,936,461 | Sando et al. | Nov. 21, 1933 |
| 2,386,788 | Geldhof et al. | Oct. 16, 1945 |

FOREIGN PATENTS

| | | |
|---|---|---|
| 133,084 | Switzerland | May 15, 1929 |
| 331,813 | Germany | Jan. 13, 1921 |
| 433,512 | Great Britain | Aug. 15, 1935 |
| 547,961 | Great Britain | Sept. 18, 1942 |